Sept. 25, 1951 V. MUSCAT ET AL 2,569,325
TUBULAR DISPENSING CONTAINER
Filed Jan. 11, 1947
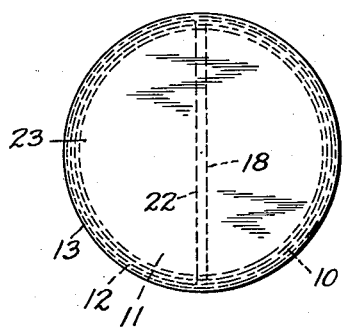
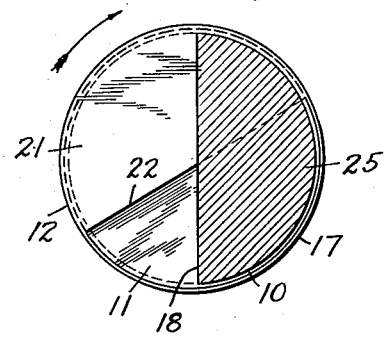
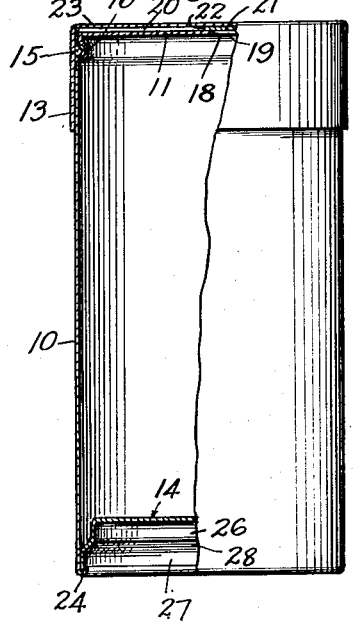
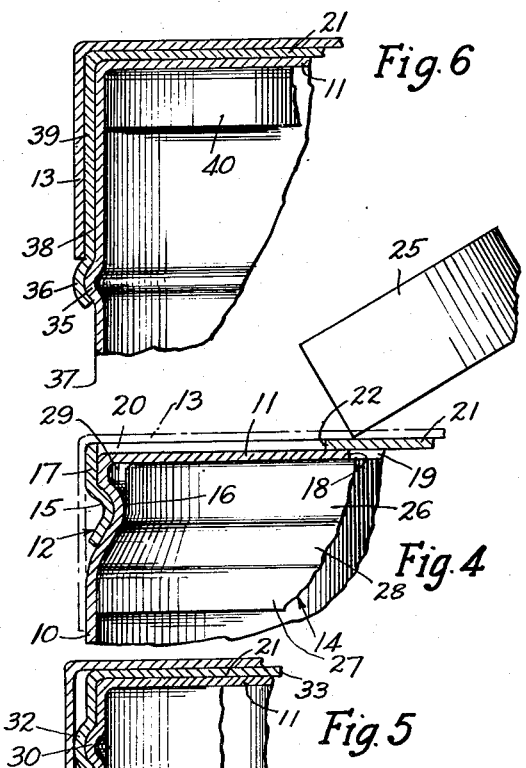
Inventors
Victor Muscat
Harold F. Temple
By Harry Jocelon
Attorney Patented Sept. 25, 1951

2,569,325

UNITED STATES PATENT OFFICE 2,569,325

TUBULAR DISPENSING CONTAINER

Victor Muscat, Atlantic Beach, and Harold F. Temple, Elmont, N. Y., assignors to Victor Metal Products Corporation, Brooklyn, N. Y., a corporation of New York Application January 11, 1947, Serial No. 721,610

8 Claims. (Cl. 222—387)

1

This invention relates to tubular containers and particularly to those adapted to extrude material therefrom.

The invention contemplates the provision of a relatively rigid container carrying at one end a rotatable member adapted to cut off a slice or block of material extruded through an opening in said end by the pressure on the material caused by the upward movement of a false bottom at the other end.

The invention further contemplates the provision of a dispensing container having relatively few parts including an axially movable bottom and a perforate rotatable top part, each of the parts being adapted to be formed by an impact extrusion operation upon a slug of soft metal such as aluminum, the parts being quickly, easily and inexpensively assembled.

The invention further contemplates the provision of a combined package and dispenser adapted particularly for cheese of stiff putty-like consistency, wherein the cheese is normally held and sealed against contamination, but permitting the extrusion of a block of any desired length and of a predetermined cross sectional size and shape, and also enabling the cutting off of said block, whereafter the package may be resealed for subsequent use.

The various objects of the invention will be clear from the description which follows and from the drawings, in which Fig. 1 is a partial front elevational view and partial vertical sectional view of a dispensing container showing one form of the invention as it appears with the top closed or sealed, the movable bottom being shown at the lower end of the container.

Fig. 2 is a top plan view thereof.

Fig. 3 is a similar view thereof, showing the extruded contents of the container shaded and the rotatable slicing cap of the container turned through an angle in the direction of the arrow to start the slicing off of the extruded contents.

Fig. 4 is a fragmentary vertical sectional view similar to Fig. 1 on an enlarged scale of the form of the invention shown in Fig. 1 but showing the bottom moved to the top of the container and the rotatable cap completely turned into its top-closing position and cutting off the protruding block of the contents of the container, the removable cap being shown in dash-dot lines.

Fig. 5 is a similar view of a modified form of the invention showing the removable cap in place.

Fig. 6 is a similar view of another modified

2 form of the invention wherein the movable bottom is of substantially uniform diameter throughout, and may be moved up to the top of the container to dispense substantially all of the contents.

In the practical embodiment of the invention shown by way of example, the dispensing container comprises generally the container 10 which is open at its bottom and partly closed at its top by the half end wall 11, the rotatable slicing cap 12 and the removable slip cap 13, the movable bottom 14 being slidable vertically inside of the container. It will be understood that the parts mentioned may take somewhat different shapes and may be connected in different ways, and some such shapes and connections have herein been illustrated.

As shown in Figs. 1 to 4, the rotatable slicing cap 12 is held to the container 10 by the inwardly projecting annular bead 15 engaging the similar bead 16 in the container wall. Hence the cap 12 may rotate around the container but cannot be lifted off. The unbeaded or cylindrical part 17 of the flange of the rotatable cap 12 is preferably of the same diameter as the tubular part of the container 10, whereby the tubular slip cap 13 engages both of the parts 10 and 17 when in place to seal the top of the container as shown by the dash-dot lines of Fig. 4. The preferably straight edge 18 on the half end wall 11 is arranged to extend past the center line of the top end of the container and the remainder of the top is open as at 19, the opening 19 being of lesser extent that a semi-circle and the half end wall 11 being preferably flat and of greater extent than a semi-circle. Similarly, the opening 20 in the slicing cap 12 has a straight cutting edge 22 and is of lesser extent than a semi-circle and of the same size as the opening 19, while the half end wall 21 is preferably flat and of greater extent than a semi-circle and of the same size as the half wall 11, the under face of the half wall 21 having at least some part in contact with the upper face of the half wall 11 at all times.

It will now be clear that the rotatable cap 12 may be turned on the container 10 to such a position (Figs. 1, 2 and 4) that the innermost portions of the half walls 11 and 21 overlap each other, and the opening 19 of the container top is closed by the half wall 21 of the cap 12 thereby to seal the top of the container when the tubular slip cap 13 is removed. Said slip cap has a closed upper end 23 which seals the top of the container even if the rotatable cap 12 is not turned into the correct position to seal the opening 19.

Means are provided to force any desired amount of the contents of the container 10 out through the openings 19 and 20 after said openings have been brought into registration by turning the cap 12 to the desired position. Said means comprises the tubular movable bottom 14 fitted into, and operating as a piston in, the tubular container member 10 to force out therefrom or to extrude the contents when such contents are in extrudable form. As has been indicated, the contents may be in the form of sliceable or processed cheese harder than cheese of the spreadable variety, but softer than the "hard" cheeses and somewhat moldable under pressure. The cheese package is made by inserting the cheese into the container 10 before the bottom 14 is in place. After the bottom is inserted into the lower end, the lowermost edge of the container is preferably rolled over the lowermost edge of the depending flange of the bottom 14 as at 24 to prevent removal or loss of the bottom and to provide a rounded or rolled edge on the bottom of the container not likely to cut the hand or fingers of the user when the bottom is manipulated to dispense the contents. With the various parts in the positions of Fig. 1, the package is adequately sealed and may keep in the same manner as the usual sealed cheese package.

To dispense some of the contents, the tubular slip cap 13 is removed to expose the rotatable cap 12, which is turned to bring the opening 20 thereof into registration with the opening 19 of the container. The bottom 14 is now forced upwardly to press upon the contents of the container and to force said contents out of the openings 19 and 20 in semi-cylindrical form as shown by the line-shaded block 25 of Fig. 3. When a block or quantity of sufficient length has been extruded, the rotatable cap 12 is rotated in the direction of the arrow of Fig. 3. Such rotation carries the cutting edge 22 into the extruded or projecting block to shear off said block in the plane of the contacting surfaces of the half walls 11 and 21 (Figs. 3 and 4) thereby to provide a block or slice to be used for tid-bits, sandwiches or the like.

It will be noted that all of the parts of the dispensing container described are of generally tubular and preferably cylindrical form having thin walls and being so shaped that they may be made of a single piece of material economically by the impact extrusion method. It will also be seen that the bottom 14 has a reduced upper end portion 26 to permit said portion to pass the bead 16 and to reach the under face of the half wall 11 thereby to empty the container of its contents, the portion 26 being joined to the enlarged part 27 of the bottom by a conical portion 28. However, some of the contents may remain in the space 29 (Fig. 4) above the bead 16. To minimize the amount of the contents not dispensed and the consequent waste, the beads connecting the rotatable cap to the container may be arranged otherwise than as shown in Fig. 4.

For example, as shown in Fig. 5, the bead 30 on the container member 31 may be directed outwardly instead of inwardly and the bead 32 on the rotatable cap member 33 may be similarly directed outwardly and fitted to the bead 30 to permit rotation of the cap 33 while preventing separation thereof from the container. In this case, the outermost diameter of the bead 32 is preferably the same as that of the container 31 whereby the slip cap member 13 frictionally engages the bead 32 as well as the container normally to seal the top of the package. The structure of the remainder of the dispensing package may be the same as that shown in Fig. 1 and hereinbefore described.

In the form of the invention shown in Fig. 6, the outwardly directed and coacting beads 35 and 36 in the container member 37 and the rotatable cap member 38 respectively are arranged in sufficient downwardly spaced relation to the half walls 11 and 21 to permit the slip cap 13 to become disposed entirely above the beads and normally in frictional contact with the cylindrical wall 39 of the cap 38 above the beads. Hence the package does not have an undue number of projecting thicknesses of material around the outer surface thereof, and in addition, the tubular movable bottom 40 may be made of uniform diameter and nevertheless may reach the top of the container. Only a negligible amount of material may be caught in the inside of the bead 35 and may not be dispensed.

While certain specific forms of the invention have herein been shown and described, various changes may be made therefrom within the spirit of the invention defined in the appended claims.

We claim:

1. A dispensing container comprising an elongated tubular container member adapted to hold material to be dispensed, said member having a substantially semi-circular flat end wall closing slightly more than half of one end thereof and being open at the other end thereof, and a tubular rotatable cap member having an end wall of substantially the same size and shape as the end wall of the container member, and interengaging beads on said members securing the members together against separation and permitting relative rotation thereof, the beads being adjacent the end walls and extending inwardly of the members, and a movable tubular bottom in the container member having an upper portion reduced in diameter to clear the beads when the bottom is moved to the top of the container.

2. A dispensing container according to claim 1 including a tubular slip cap having a closed end and an open end, and removably fitted over the cap member and having a flange terminating below the beads and engaging the container member and the cap member when in place over the end walls of the members.

3. A dispensing container comprising an elongated tubular cylindrical member open at one end thereof and having slightly more than half of the other end thereof closed by a flat end wall thereby to provide an opening in said other end, the end wall having a straight edge thereon parallel to and arranged on one side of a diameter of said end whereby said opening is substantially semi-circular, a tubular rotatable cap member having an end wall arranged to seal the opening on the rotation of the cap and being of substantially the same size and shape as the end wall of the elongated member and having a straight edge thereon serving as a cutting edge parallel to and on the other side of said diameter when the opening is closed, corresponding portions of the end walls adjacent the respective straight edges overlapping each other when the opening is closed, the area of each of the openings adjacent the end walls of the members being the maximum possible while permitting the above mentioned sealing of said openings, a movable tubular bottom normally at the open end of the elongated member and movable therein toward the other end thereof to extrude the contents of the container in the form of a semi-cylindrical block out through the openings of the members, said bottom having a generally cylindrical skirt engaging the inner surface of the elongated member, said elongated member terminating at the open end thereof in an annular bend of substantially semi-circular cross section and having an annular groove therein normally receiving the lowermost edge portion of the skirt of the tubular bottom and thereby normally sealing said open end, half of the straight cutting edge operating to slice off the extruded block on the relative rotation of the members in one direction and the other half of said edge being operative to slice off an extruded block on the relative rotation of the members in the opposite direction, and a slip cap covering the cap member and having a closed end.

4. The dispensing container of claim 3 and interengaging beads on the elongated and cap members in proximity to the end walls to secure said members together against separation while permitting relative rotation thereof, the outermost part of the bead in the cap member being in coaxial alignment with the outermost surface of the elongated member, the skirt having an upper portion reduced in diameter to the least diameter of the bead of the elongated member whereby said upper portion is movable past the last mentioned bead, the slip cap having a smooth continuous flange of uniform inner and outer diameters depending from the closed end of the slip cap, the inner diameter being substantially equal to the diameter of the outermost surface of the elongated member and of the bead of the cap member, the inner surface of the slip cap contacting the outermost surfaces of the cap member and the elongated member in the operative container-closing position of the slip cap.

5. A dispensing container comprising an elongated tubular container member adapted to hold material to be dispensed, said member having a flat end wall partly closing one end thereof and terminating in an inner straight edge, the member being open at the other end thereof and terminating at said end in an inwardly extending bend, the peripheral edge of the bend being in inward spaced relation to the inner surface of the member to provide an annular groove therebetween, a tubular cap member having an end wall thereon in face to face engagement with the end wall of the container member and partly closing one end of the cap member and terminating in a straight edge, interengaging beads on said members adjacent the end walls and rotatably securing the members together against separation, and a piston-like bottom within the container member provided with a top and a skirt depending from the top, the lowermost edge portion of the skirt normally entering the annular groove at said bend of the container member and being removable therefrom on upward movement of the bottom, the upper part of the skirt being of lesser diameter than the lower part thereof to clear said beads when the bottom is moved to the upper end of the container member.

6. The dispensing container of claim 5, the respective beads extending inwardly of the outermost surfaces of the cap member and of the container member, the container including a cylindrical slip cap having an inside diameter substantially equal to the outermost diameters of the members.

7. The dispensing container of claim 5, the upper portion of the container member being of lesser diameter than the remainder thereof, the beads extending outwardly of the container and cap members, the outermost diameter of the bead of the cap member being substantially equal to the outermost diameter of the lower part of the container member.

8. The dispensing container of claim 7, the container including a cylindrical slip cap having an innermost diameter substantially equal to the outermost diameter of the lower part of the container member.

VICTOR MUSCAT.
HAROLD F. TEMPLE.

REFERENCES CITED

The following references are of record in the file of this patent:

UNITED STATES PATENTS

| Number | Name | Date |
| --- | --- | --- |
| 1,279,290 | De Camps | Sept. 17, 1918 |
| 2,085,446 | Philippe | June 29, 1937 |
| 2,206,209 | Thorn | July 2, 1940 |
| 2,208,840 | Gialloreto et al. | July 23, 1940 |
| 2,270,935 | Doering | Jan. 27, 1942 |